(12) United States Patent
Sagaspe et al.

(10) Patent No.: US 7,735,727 B2
(45) Date of Patent: Jun. 15, 2010

(54) REWARD SYSTEM AND METHOD FOR CASH REPLACEMENT SYSTEM

(75) Inventors: Patrick Pierre Sagaspe, Lake Worth, FL (US); Christian Duroux, Paris (FR)

(73) Assignee: Monaco Fund, Inc., Panama City (PA)

( * ) Notice: Subject to any disclaimer, the term of this patent is extended or adjusted under 35 U.S.C. 154(b) by 971 days.

(21) Appl. No.: 11/425,058

(22) Filed: Jun. 19, 2006

(65) Prior Publication Data
US 2006/0293988 A1 Dec. 28, 2006

Related U.S. Application Data

(60) Provisional application No. 60/694,149, filed on Jun. 24, 2005.

(51) Int. Cl.
*G06K 5/00* (2006.01)
(52) U.S. Cl. .................. 235/380; 235/375; 235/378; 235/379; 705/14
(58) Field of Classification Search ............ 235/380, 235/379, 487, 378, 375; 705/14, 402
See application file for complete search history.

(56) References Cited

U.S. PATENT DOCUMENTS

| | | | |
|---|---|---|---|
| 4,194,242 A | 3/1980 | Robbins | |
| 5,025,372 A | 6/1991 | Burton et al. | |
| 5,056,019 A | 10/1991 | Schultz et al. | |
| 5,794,210 A | 8/1998 | Goldhaber | |
| 6,018,718 A | 1/2000 | Walker et al. | |
| 6,142,371 A * | 11/2000 | Oneda ................ | 235/380 |
| 2003/0078882 A1 * | 4/2003 | Sukeda et al. .......... | 705/39 |
| 2005/0097034 A1 * | 5/2005 | Loeger et al. .......... | 705/39 |
| 2006/0020511 A1 | 1/2006 | Postrel | |
| 2006/0208065 A1 * | 9/2006 | Mendelovich et al. ...... | 235/380 |
| 2006/0265288 A1 * | 11/2006 | Aronson .............. | 705/26 |
| 2006/0287943 A1 * | 12/2006 | Postrel ............... | 705/37 |
| 2006/0293953 A1 * | 12/2006 | Nicholson ............ | 705/14 |

FOREIGN PATENT DOCUMENTS

WO  WO 99/22328 A1  5/1999

\* cited by examiner

*Primary Examiner*—Edwyn Labaze
(74) *Attorney, Agent, or Firm*—Greenberg Traurig, LLP

(57) ABSTRACT

A reward system and method for cash replacement cards wherein a card is issue by a bank or other financial institution to a cardholder. Such a card may be a credit or debit card and provides for a reward, not available to the general public, to the cardholder, based on his or her usage, in the form of a commodity that has a known history of increasing in value over time, such as diamonds.

23 Claims, No Drawings

REWARD SYSTEM AND METHOD FOR CASH REPLACEMENT SYSTEM

RELATIONSHIP TO PENDING APPLICATIONS

This application claims the benefit of and priority to U.S. Provisional Application Ser. No. 60/694,149, filed Jun. 24, 2005, the content of which is incorporated by reference herein in its entirety.

BACKGROUND OF THE INVENTION

1. Field of the Invention

The invention relates to debit and credit cards; and, more particularly, for a reward program for cash replacement cards, such as debit and credit cards.

2. Related Art

Credit cards used in place of cash to make purchases are extremely popular. Initially, credit cards enabled one to delay payment until the bill for the purchases reached the card user. The user then had to option to pay off the balance owed within a preset time without incurring interest charges, or delaying full payment by making a partial payment thereby incurring interest charges on the unpaid balance.

Some time after the introduction of such credit cards, some credit card companies came up with plans to reward the purchaser each time he or she made a purchase. For example, frequent flyer programs associated with some credit cards reward the purchaser with airline mileage that can be redeemed with air travel.

Recently, some credit card issuers began rebating a certain dollar amount to the purchaser, such as 1% to 2% of purchases, rebated to the purchaser at a predetermined time after payment of charges by the purchaser.

These are generally referred to as cash back credit card programs. The more one uses the card, the more cash rewards one receives. Some programs pay a fixed percentage, such as 5%, on certain types of purchases, and a lesser percentage, such as 1% on all other purchases, regarding the amount spent.

Other programs may offer gift certificates or coupons, rebates on gasoline purchases, etc. Thus, cash back programs generally involve 3 basic components—a percentage earned on purchases, expenditures in certain categories sometimes being rewarded at higher rates, and the way the rewards are delivered to the purchaser.

Such cards may or may not have an annual fee and are used throughout the world.

There are also cards called debit cards that are used as cash at the time of purchase. That is, one pays for a commodity with such debit card, and the amount is automatically deducted from one's account.

Such cards thus return a certain monetary value that is fixed in value at the time the rebate is made. There is need for a cash replacement card, such as a debit or credit card, that provides a rebate to the purchaser in the form of a known commodity that traditionally increases in value and is highly desirable to the purchaser.

SUMMARY OF THE INVENTION

It is an object of this invention to provide a system and method for a cash replacement card that returns a rebate to the user of such cards in the form of an interest in a known commodity that traditionally increases in value and is highly desirable to the purchaser.

It is a further object of this invention to carry out the foregoing object where the commodity is diamonds.

There is disclosed a reward system and method for cash replacement cards wherein a card is issued by a bank or other financial institution to a cardholder. Such a card may be a credit or debit card and provides for a reward, not available to the general public, to the cardholder, based on his or her usage, in the form of a commodity that has a known history of increasing in value over time, such as diamonds.

DESCRIPTION OF THE PREFERRED EMBODIMENT

As particularly contemplated in the present invention, there is disclosed a new and unique method and system for providing a debit or credit cash replacement card that, instead of a conventional cash back to the card owner, purchases, invests and capitalizes the purchaser in real diamonds. Such diamonds can be any grade but preferably round Gemological Institute of America (GIA) or HOGE RAAD VOOR DIAMANT (HRD) certified diamonds from ½ to 1 carat in weight. Such diamonds are of the best quality on the market and usually reserved for the finest jewelry creations in the world. Such diamonds have not depreciated in value for the past 50 years; they have always increased in value.

Thus, the cardholder will not only be rewarded for using the cash replacement card herein, but will have access to diamonds of a quality at a professional price that is a large discount from the usual retail price of such diamonds.

There is also a definite advantage to the issuing bank. That is, the bank issuing the cash replacement card herein not only is providing the cardholder with the investment in diamonds but is providing a prestigious, exclusive and luxurious program to the cardholder. Such a program will generate profit to the issuing bank and give the bank a leg up over competing banks.

The actual card itself may have a diamond design on the card adding to its uniqueness and exclusivity.

Although any suitable diamonds can be used, round cut diamonds of D to F in color and IF to VVS in clarity divided by 5, are preferred. These diamonds are defined on 6 different charts of reference from size 0.01 to 2.0 carats. Such diamonds are preferably cut and polished diamonds.

The cardholder automatically benefits on the day he or she receives his or her card as a diamond investment saving account is attached to this card. This account is managed directly or indirectly by the credit organization or the bank. This account will be credited to the cardholder based on a percentage defined by the issuing bank or credit organization on the percentage of each purchase paid by the "Diamond Card". The cardholder, by this principal, accumulates diamonds by saving in the diamond account on each purchase. This account will be credited in the form of cut, round diamonds. Each month the cardholder statement will be sent with a report of accumulated diamonds by 1/100 carat showing his or her savings in diamonds/value.

The reference of the calculation for the financial value of the diamond is determined by the one carat diamond. This one carat diamond is devised of cut diamond stones based on 1/100 or 0.01 carat, that is to say 100 cut stones per carat. This means that the financial value of the diamond is based on one carat or on 1/100 carat.

The base of calculation for the financial value of the carat, or for 1/100 carat, for the diamond account is calculated using the professional reference, Rapaport. The Rapaport Diamond Report is a monthly wholesale diamond price list used by dealers worldwide to keep up with changing market prices.

(The Rapaport is reserved exclusively for the professional and is only a price reference and only licensed dealers can buy diamonds through the "Diamond Bourse". This is an association for dealers and traders of rough and polished diamonds, or a building provided by the bourse, housing members, who may also be cutters (manufacturers), brokers (agents). Every bourse has a strict set of rules for conduct to which all members must adhere. Individual Bourse are usually members of the World Federation of Diamond Bourse.) It is important to understand that the diamond Bourse is not like the stock market or gold bullion. The buying and selling diamond transactions are not public and each transaction is private with different prices. The Rapaport is only a base reference for negotiation. It is not a quotation.

The goal for the Diamond Card/Diamond Account is to determine for the general public a quotation/value of diamonds. (Today the general public does not have a price comparison for the purchase of diamonds in the retail market. For this essential reason, but not only for this reason, there is no portfolio or stock market for diamond investments. As opposed to diamonds, gold bullion has a quotation based on one ounce or bar with a purity of 9.999. Of course, gold, like diamonds has different grades of purity and quality which are less than the reference of 9.999).

Diamonds today are sold to the general public with a large scale of price differentiation based on quality which is defined by the color, clarity, cut, and weight/carat of each stone. Each diamond has a different price because of this, and each retailer practices his own pricing. The goal is to define a principal of calculation for pricing diamonds for the general public which can be easily applied to the financial world and the portfolio management/diamond account.

The Rapaport clearly defines this kind of cut stone on five different charts of reference from the size of 0.01 to 0.29 carats. These different charts include the quotation for different color and clarity for each size. As the point of reference, only the best quality from each chart, color D to F, clarity IF to VVS, is used. For this quality of stone, every three months, the Rapaport Diamond Report issues a reference price for the professional on each chart. This Report can be used to calculate an average price among, for example, five or six charts of color and clarity for diamonds from 0.5 to 1.0 carats.

One carat diamond is equal to the addition of the Rapaport Diamond Report price from the five charts from 0.01 to 0.29 carats. D to F color and IF to VVS clarity, divided by five. Using this method a calculated average price for the general public for a one carat and/or 1/100 carat stone D to F color and IF to VVS clarity has been determined.

Example: Based on the June 2005 Rapaport Diamond Report, the total price of the six charts for diamonds sized from 0.01 to 0.29 carats with D to F color IF to VVS clarity is $8,240.00 divided by six to obtain an average price per carat of $1,373.33 or $13.73 per 1/100 carat.

The portfolio/diamond account disclosed herein preferably will consist of stones sized 0.01 to 2.0 carats only.

For each purchase of goods and services using the Diamond Card disclosed herein, the cardholder will accumulate/invest/save a cut diamond(s) corresponding to a percentage of the purchase price. The diamonds accumulated/invested/saved is based on 1/100 carat. Each billing cycle the card holder will receive a statement of his portfolio/diamond account which stipulates the number of diamonds accumulated, weight per 1/100 carat and value per carat. When the cardholder reaches one carat in accordance with his statement issued by the Diamond Card, the cardholder has the choice to claim his or her diamonds, or to keep them as an investment/savings in a portfolio/diamond account. In this case, he or she can continue to save/invest by accumulating diamonds (diamonds, for the last fifty years in opposition to any other investment, have always increased in value). The issuing bank or financial center issuing the card can decide the time limitation or the accumulation of diamonds.

The most important aspects of diamonds are cut, clarity, color and carat weight. Such standards are used by the industry to evaluate a diamond's quality, value and beauty. Diamonds come in various cut shapes, such as Brilliant, Oval, Radiant, Marquis, Heart, Emerald, Pear, Princess and Triangle. Preferably, the shape used in the system and method disclosed herein is the Round Brilliant cut, which has between 57 and 58 facets.

The measuring unit for the carat is the metric carat, which corresponds to the fifth of 1 gram, that is to say 2 decigrams. Thus, 1 carat=0.2 gram. The carat is divided into 100 points (hundredths of metric carat); in other words, a diamond of 0.25 carat has 25 points.

As heretofore discussed, a clarity of IF to VVS is preferred. The following chart illustrates the International Clarity Scale.

| International Clarity Scale | |
| --- | --- |
| FLAWLESS (FL) | These stones have no imperfections inside or on the outside of the stone under the magnification of a loupe of 10 power. |
| INTERNALLY FLAWLESS (IF) | These stones have no inclusions under a loupe with a 10 power magnification. Loupe clean |
| VVS1 VVS2 | These stones have very small inclusions which are very difficult to see under a loupe with a 10 power magnification. VVS = Very Very Slightly Included. |
| VS1 VS2 | These stones have small inclusions which are slightly difficult to see under a loupe with a 10 power magnification. VVS = Very Slightly Included. |
| SI1 SI2 SI3 | These stones have inclusions which are fairly easy to see under a loupe with a 10 power magnification, or visible to the naked eye. GIA, the largest and most widely accepted Gem Laboratory in the world, does not recognize SI3 grades. SI = Slightly Included. |
| I1 | Flaws that are visible to the naked eye. I1 = Included 1. |
| I2 | Many flaws clearly visible to the naked eye that also decrease the brilliance. I2 = Included 2. |
| I3 | Many flaws clearly visible to the naked eye which decrease the brilliance and compromise the structure of the diamond, making it more easily cracked or chipped. I3 = Included 3. |

As heretofore discussed, diamonds having a color of D to F are preferred.

The following chart illustrates the International Color Scale.

| International Color Scale | | |
| --- | --- | --- |
| Exceptional White + | D | Diamond disappears almost in the ultra white pre-folded cards. |
| Exceptional White | E | |
| Rare white + | F | A light tint is perceptible on side. |
| Rare white | G | |
| White | H | A tint is perceptible on side, difficult to see front view. |
| Slightly Tinted White | I-J | A tint is visible front view. |
| Tinted White | K-L | Easily visible tint front view. |
| Tinted Color | M-Z | Tint very easily visible front view (we speak sometimes about 1st tinted, 2nd tinted, 3rd tinted, 4th tinted according to the intensity of this color). |

It can be seen that there is provided a cash replacement card associated with the purchase of diamonds that indicates to the world the exclusive and powerful image of diamonds. Diamonds portray loyalty, strength and durability. The cardholder is not only obtaining a reward, but a reward in a valuable commodity that will increase in value. The reference to "diamond" or "diamonds" refers to real diamonds as known in the trade, not cubic zirconium or artificial diamonds.

Example

The amount of the purchases by the cardholder for one year using the Card disclosed herein is $100,000. The issuing bank thus may grant 2% cash back, or $2,000.

Based on the Rapaport Diamond Report, +10% (report of the month), the total price for diamonds selected by the issuing bank from 5 colors and 5 clarifies is $2,680. The cardholder thus accumulates $2000/2680 or approximately 0.75 carat of diamond. He or she will receive a true diamond from 0.50 ct to 1 carat and has the choice of claiming the diamond or keeping it as an investment or savings in an account. When he or she receives a 0.70 ct stone, the 0.05 ct is accumulated on his or her Cash Back account.

Since the value of diamonds is stable and always increases over a long term period, the risk for the bank or investment service and the cardholders will never exist. The bank, or service, determines its cash back program on the diamond's retail price which means the spread between the buying price (for the bank or service) and the retail price (jewelry price) is very large. In other words, the bank or service purchases the diamonds at a value of Rapaport+10%, but the retail price is minimally 2 or 4 times higher. The bank or service determines also the value of the selected diamonds in equation with the cash back value to the cardholder and the retail price plus a discount.

For example:

Rapaport=$2,000

Buying price=Rapaport−10%=$1,800

Selling price=Rapaport+10%=$2,200 (purchasing price for the bank or investment service)

Retail price=$8,000

Determined Value with the cash back value to the cardholder=$7,000

Between 2,200 and 7,000, the bank or investment service has enough spread to guarantee, first, the cardholders against any risk of fluctuation, and, second, the cash back program generates profit.

The cardholder receives, in fact, a diamond having a value of $8,000, and the bank offers him or her the diamond for $7,000.

To standardize the system and method here, it is proposed to use diamonds from 0.5 to 1 ct, but this can vary.

Also, although a bank or investment service is disclosed as issuing a debit or credit card to a cardholder, the method and system disclosed herein may be used in conjunction with a savings or cash investment account wherein the bank or other financial institution rewards the saver or investor with a diamond, or interest in diamonds, as disclosed herein, depending on the cash amount in the saver or investor's account.

Although a particular embodiment of the invention is disclosed, variations thereof may occur to an artisan and the scope of the invention should be limited only by the scope of the appended claims.

The invention claimed is:

1. A method for rewarding a cardholder holding a cash replacement card based on usage of the card over a period of time comprising the step of:
   issuing said cardholder a cash replacement card maintained in user account in the name of the user maintained by a financial institution;
   recording transactions when said card is used by said user at said financial institution;
   awarding the cardholder an interest in a commodity not available to the general public based on usage of the card wherein said commodity has a known history of increasing in value over time; and
   recording said interest in said user account maintained by said financial institution.

2. The method of claim 1 wherein the step of awarding the cardholder an interest in a commodity includes the step of awarding the cardholder an interest in a diamond having a value of at least about 10% over the average price per carat of a diamond based on the RAPAPORT DIAMOND REPORT (RAPAPORT) charts of reference for diamonds.

3. The method of claim 2 wherein the step of awarding the cardholder an interest in a diamond includes the step of awarding the cardholder an interest in a diamond having a color between about D to H as determined by the International Color Scale relating to diamonds.

4. The method of claim 2 wherein the step of awarding said cardholder an interest in a diamond includes the step of awarding said cardholder in an interest in a diamond having a clarity of between about 1F to VS2 as determined by the International Clarity Scale relating to diamonds.

5. The method of claim 4 wherein the step of awarding said cardholder with an interest in a diamond having a clarity includes the step of awarding said cardholder with a diamond having a clarity between about 1F to VVS.

6. The method of claim 2 wherein the step of awarding said cardholder an interest in a diamond includes the step of awarding said cardholder in a diamond having a round brilliant cut.

7. The method of claim 6 wherein the step of awarding said cardholder an interest in a brilliant cut diamond includes the step of awarding said cardholder in a brilliant cut diamond having between 57 and 58 facets.

8. The method of claim 2 including the step of issuing a periodic statement to the cardholder associated with said card stipulating the number of diamonds accumulated by weight per $\frac{1}{100}$ carat and value per carat.

9. The method of claim 8 including the step of providing to the cardholder the option of claiming diamonds accumulated or maintaining them as an investment in an account when a predetermined weight in diamonds is reached.

10. The method of claim 1 wherein the step of awarding the cardholder an interest in a commodity includes the step of awarding the cardholder an interest in a diamond.

11. A system for rewarding a cardholder holding a cash replacement card based on usage of the card over a period of time comprising:
   cardholder user account means maintained in a financial institution relating to said user;
   card issuing means in said user account at said institution for issuing a cash replacement card to the cardholder;
   reward program means associated with said card for awarding the cardholder an interest in a commodity associated with said card not available to the general public based on usage of the card whereon said commodity has a known history of increasing in value over time; and reward program recording means associated with said user account at said financial institution for recording said cardholder's interest in said commodity.

12. The system of claim 11 wherein the award program means includes diamond interest means for awarding the cardholder with an interest in a diamond having a value of at least about 10% over the average price per carat of a diamond based on the RAPAPORT DIAMOND REPORT (RAPAPORT) charts of reference for diamonds.

13. The system of claim 12 wherein said award program means includes diamond interest means for providing the cardholder with an interest in a diamond.

14. The system of claim 12 wherein said diamond interest means includes means for providing an interest in a diamond having a color between about D to H as determined by the International Color Scale relating to diamonds.

15. The system of claim 12 wherein said diamond interest means includes means for providing interest in a diamond having a clarity of between about 1F to VS2 as determined by the International Clarity Scale relating to diamonds.

16. The system of claim 15 wherein said diamond interest means includes means for providing an interest in a diamond having a clarity between about 1F to VVS.

17. The system of claim 12 wherein said diamond interest means includes means for providing an interest in a diamond having a round brilliant cut.

18. The system of claim 17 wherein said diamond interest means includes means for providing an interest in a brilliant cut diamond having between 57 and 58 facets.

19. The system of claim 12 including periodic statement issuing means to the cardholder associated with said card a statement stipulating the number of diamonds accumulated by weight per $1/100$ carat and value per carat during a predetermined period.

20. The system of claim 19 wherein said statement issuing means provides to the cardholder the option of claiming diamonds accumulated or maintaining them as an investment in an account when a predetermined weight in diamonds is reached.

21. The system of claim 20 wherein the statement issuing means provides to the cardholder the option of claiming the diamonds or maintaining them in an account when a weight of ½ carat is reached.

22. A system for rewarding a saver or investor who has deposited funds in a savings or investment account based on the amount of money in said account, comprising:
   an account recording means in a financial institution maintained by said financial institution for the benefit of said saver or investor;
   issuing an account card to said saver or investor associated with said account maintained by said financial institution;
   reward program means associated with said account card for awarding the cardholder an interest in a commodity associated with said card not available to the general public based on the amount of money in said account whereon said commodity has a known history of increasing in value over time; and
   a reward program recording means maintained by said financial institution for recording interest in commodities obtained by said saver or investor.

23. The system of claim 22 wherein the award program means includes diamond interest means for awarding the saver or investor with an interest in a diamond.

* * * * *